(12) United States Patent
Seo et al.

(10) Patent No.: US 11,155,466 B2
(45) Date of Patent: Oct. 26, 2021

(54) METHOD FOR PREPARING GRAPHITE SHEET

(71) Applicant: SKC CO., LTD., Gyeonggi-do (KR)

(72) Inventors: Jung Doo Seo, Gyeonggi-do (KR); Jung-Gyu Kim, Gyeonggi-do (KR); Jonggab Baek, Gyeonggi-do (KR)

(73) Assignee: SKC CO., LTD., Gyeonggi-do (KR)

( * ) Notice: Subject to any disclaimer, the term of this patent is extended or adjusted under 35 U.S.C. 154(b) by 0 days.

(21) Appl. No.: 16/343,722

(22) PCT Filed: Oct. 20, 2017

(86) PCT No.: PCT/KR2017/011669
§ 371 (c)(1),
(2) Date: Apr. 19, 2019

(87) PCT Pub. No.: WO2018/074889
PCT Pub. Date: Apr. 26, 2018

(65) Prior Publication Data
US 2019/0270645 A1    Sep. 5, 2019

(30) Foreign Application Priority Data

Oct. 21, 2016    (KR) .......................... 10-2016-0137698

(51) Int. Cl.

| | | |
|---|---|---|
| *C01B 31/04* | (2006.01) | |
| *C01B 32/205* | (2017.01) | |
| *D06M 15/59* | (2006.01) | |
| *D06M 15/71* | (2006.01) | |
| *C01B 32/20* | (2017.01) | |
| *C04B 35/622* | (2006.01) | |
| *C04B 35/52* | (2006.01) | |
| *C04B 41/83* | (2006.01) | |
| *D06M 101/06* | (2006.01) | |

(52) U.S. Cl.
CPC ............ *C01B 32/205* (2017.08); *C01B 32/20* (2017.08); *C04B 35/52* (2013.01); *C04B 35/622* (2013.01); *C04B 41/83* (2013.01); *D06M 15/59* (2013.01); *D06M 15/71* (2013.01); *C01P 2006/10* (2013.01); *C01P 2006/32* (2013.01); *C01P 2006/40* (2013.01); *D06M 2101/06* (2013.01)

(58) Field of Classification Search
CPC ....... C01B 32/205; C01B 32/20; C04B 35/52; C04B 35/622; C04B 41/83; D06M 15/59; D06M 15/71; D06M 2101/06; C01P 2006/10; C01P 2006/32; C01P 2006/40
USPC ........................................................ 423/448
See application file for complete search history.

(56) References Cited

U.S. PATENT DOCUMENTS

| | | | | |
|---|---|---|---|---|
| 3,927,186 | A * | 12/1975 | Vinton ................. | C04B 35/524 423/447.1 |
| 4,279,952 | A * | 7/1981 | Kodama ................. | B32B 9/04 428/36.1 |
| 2014/0332993 | A1* | 11/2014 | Ooshiro ............... | C01B 32/205 264/29.6 |

FOREIGN PATENT DOCUMENTS

| | | |
|---|---|---|
| CN | 104629051 A | 5/2015 |
| JP | 61-275116 | 12/1986 |
| JP | 07-109171 | 4/1995 |
| JP | 5887494 | 3/2016 |
| KR | 10-0378163 | 3/2003 |
| KR | 10-2012-0078512 | 7/2012 |
| KR | 10-2016-0090608 | 8/2016 |
| KR | 10-2016-0109191 | 9/2016 |
| KR | 10-1669204 | 10/2016 |
| WO | 2016117856 A1 | 7/2016 |

OTHER PUBLICATIONS

Office Action issued by Japanese Patent Office dated Jun. 2, 2020.
Office Action issued by the Chinese Patent Office dated Apr. 2, 2021.

* cited by examiner

*Primary Examiner* — Stuart L Hendrickson
(74) *Attorney, Agent, or Firm* — IP & T Group LLP

(57) ABSTRACT

The embodiment relates to a method for preparing a graphite sheet having a high thermal conductivity at a low cost without using an expensive polyimide film.

8 Claims, 3 Drawing Sheets

METHOD FOR PREPARING GRAPHITE SHEET

This application is a national stage application of PCT/KR2017/011669 filed on Oct. 20, 2017, which claims priority of Korean patent application number 10-2016-0137698 filed on Oct. 21, 2016. The disclosure of each of the foregoing applications is incorporated herein by reference in its entirety.

TECHNICAL FIELD

An embodiment relates to a method for preparing a graphite sheet having a high thermal conductivity in a convenient and economical manner.

BACKGROUND ART

As electronic devices have recently been shorter, smaller, and thinner with the development of electronic devices technology, it is essential to effectively dissipate heat generated in the devices. For this purpose, various heat dissipating materials have been developed and marketed in the form of heat dissipating pads, heat dissipating sheets, heat dissipating paints, and the like. The heat dissipating sheets among them are prepared in the form of graphite sheets, polymer-ceramic composite sheets, multicoated thin metal sheets, and the like. The graphite sheets are light and slim, as well as have thermal conductivities comparable to, or even higher than, that of copper. Thus, they are used between electronic circuit boards, in a PDP for plasma televisions, and the like.

A representative example of preparing film-shaped graphite is a method referred to as "graphite expansion method." In this method, natural graphite is immersed in a mixture of concentrated sulfuric acid and concentrated acetic acid, and then rapidly heated to expand the graphite. After the acids are removed by washing the expanded graphite, the graphite thus obtained is formed into a film shape using a high-pressure press. However, the film-shaped graphite prepared by this method is weak in strength, does not have excellent physical properties, and has a problem of containing residual acids.

In order to deal with the above problems, a method has been developed in which a special polymer film is directly thermally treated to be graphitized (hereinafter, referred to as "polymer graphitization method"). The polymer film used in this method includes, for example, polyoxadiazole, polyimide, polyphenylenevinylene, polybenzoimidazole, polybenzoxazole, polythiazole, and polyamide films. The polymer graphitization method is very simple as compared with the conventional graphite expansion method. Further, it essentially does not involve incorporation of impurities such as acids and provides a graphite sheet that has an excellent thermal conductivity and an excellent electrical conductivity close to those of single crystalline graphite (see Japanese Laid-open Patent Publication Nos. 1995-109171 and 1987-275116).

DISCLOSURE OF INVENTION

Technical Problem

However, it is difficult for the polymer graphitization method to produce graphite in the form of a thick film as compared with the graphite expansion method. The polymer graphitization method also has a problem that the manufacturing cost is high.

Therefore, an embodiment aims to provide a method capable of preparing a graphite sheet having a high thermal conductivity and a relatively large thickness in a convenient and economical manner without using an expensive polyimide film.

Solution to Problem

In order to achieve the above object, an embodiment provides a method of preparing a graphite sheet, comprising:
(a) providing a substrate comprising a natural fiber, a synthetic fiber, or paper;
(b) coating one side or both sides of the substrate with a coating liquid; and
(c) thermally treating the coated substrate to graphitize it,
wherein the coating liquid comprises a liquid resin, a solvent, a dehydrating agent, and a catalyst.

Another embodiment provides a method of preparing a graphite sheet, comprising:
(1) providing a substrate comprising a natural fiber, a synthetic fiber, or paper;
(2) primarily coating one side or both sides of the substrate with a coating liquid;
(3) secondarily coating the primarily coated substrate with the coating liquid; and
(4) thermally treating the secondarily coated substrate to graphitize it,
wherein the primary coating is performed by squeezing at a pressure of at least 0.1 MPa.

Still another embodiment provides a method of preparing a graphite sheet, comprising:
disposing a coating liquid comprising a liquid resin inside or outside a porous substrate;
removing bubbles contained in the porous substrate and the coating liquid; and
graphitizing the porous substrate and the coating liquid.

Effects of Invention

According to the method for preparing a graphite sheet according to the embodiment, a graphite sheet having a high thermal conductivity and a relatively large thickness can be produced in a convenient manner. In addition, since the method uses a relatively inexpensive fiber substrate instead of an expensive polyimide film, the method can produce a graphite sheet in an economical manner.

Further, in the method of preparing a graphite sheet according to the embodiment, a coating liquid is disposed inside or outside a porous substrate such as a fiber substrate, and bubbles contained in the porous substrate and the coating liquid are removed. Accordingly, the composite sheet of the porous substrate and the coating liquid before the graphitizing process can have a dense structure. Therefore, voids in the finally produced graphite sheet after the graphitizing process can be suppressed to the utmost.

As a result, the graphite sheet according to the embodiment has a high density and can have an improved thermal conductivity.

BEST MODE FOR CARRYING OUT THE INVENTION

Figure 1:
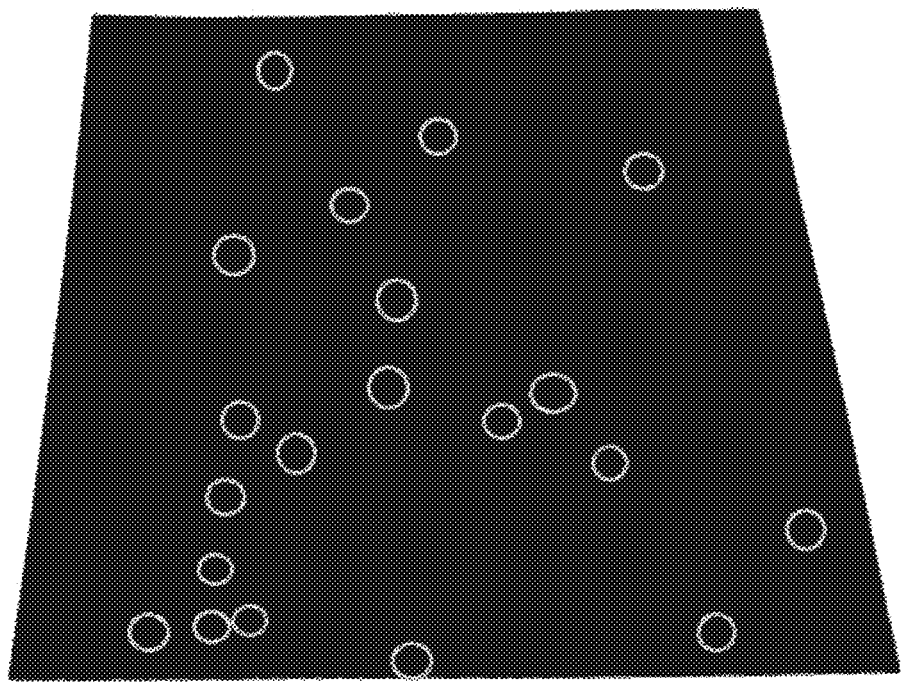
FIGS. 1 and 3 are a photograph of the surface and an enlarged photograph of the cross-section of the graphite sheet according to Comparative Example 2, respectively.

Throughout the description of the embodiments, in the case where each film, membrane, panel, or layer is mentioned to be formed "on" or "under" another film, membrane, panel, or layer, it means not only that one element is directly formed on or under another element, but also that one element is indirectly formed on or under another element with other element(s) interposed between them. Also, the term "on" or "under" with respect to each element may be referenced to the drawings. For the sake of description, the sizes of individual elements in the appended drawings may be exaggeratingly depicted and do not indicate the actual sizes.

The method of preparing a graphite sheet according to an embodiment comprises (a) providing a substrate comprising a natural fiber, a synthetic fiber, or paper;

(b) coating one side or both sides of the substrate with a coating liquid; and (c) thermally treating the coated substrate to graphitize it, wherein the coating liquid comprises a liquid resin, a solvent, a dehydrating agent, and a catalyst.

Step (a)

In this step, a substrate comprising a natural fiber, a synthetic fiber, or paper is provided. The substrate may have a lot of voids. That is, the substrate may be a porous substrate.

Typically, the natural fiber may be largely classified into a cellulose fiber, a protein fiber, and a mineral fiber. The cellulose fiber may include (i) a seed fiber such as cotton and kapok; (ii) a stem fiber such as flax, ramie, cannabis, and jute; (iii) a fruit fiber such as a coir fiber; and (iv) a leaf fiber such as Manila hemp, abaca, and sisal hemp. Further, the protein fiber may include (i) a sheep fiber, (ii) a silk fiber, and (iii) a hair fiber. In the case where the substrate constituting the graphite sheet according to the embodiment is composed of a natural fiber, the natural fiber may be at least one selected from the group consisting of cotton, hemp, wool, and silk.

Typically, the synthetic fiber may be largely classified into an organic fiber and an inorganic fiber. The organic fiber may include (i) a regenerated fiber including a cellulose-based fiber such as rayon, tencil (or lyocell), and modale, and a protein-based fiber; (ii) a semi-synthetic fiber including a cellulose-based fiber such as acetate and triacetate; and (iii) a synthetic fiber such as a polyamide fiber, a polyester fiber, a polyurethane fiber, a polyethylene fiber, a polyvinyl chloride fiber, a polyfluoroethylene fiber, a polyvinyl alcohol fiber, an acrylic fiber, and a polypropylene fiber. In the case where the substrate constituting the graphite sheet according to the embodiment is composed of a synthetic fiber, the synthetic fiber may be at least one synthetic fiber selected from the group consisting of nylon, polyester, polyurethane, polyethylene, polyvinyl chloride, polyfluoroethylene, polyvinyl alcohol, acryl, and polypropylene; or at least one cellulose-based fiber selected from the group consisting of rayon, acetate, and triacetate.

The paper is not particularly limited as long as it can be usually purchased or prepared.

Step (b)

In this step, one side or both sides of the substrate are coated with a coating liquid.

The coating liquid comprises a liquid resin, a solvent, a dehydrating agent, and a catalyst. Specifically, the coating liquid may comprise 70 to 85% by weight of the liquid resin, 2 to 10% by weight of the solvent, 10 to 20% by weight of the dehydrating agent, and 1 to 5% by weight of the catalyst.

The liquid resin may be a composition comprising at least one resin selected from the group consisting of polyimide, polyamic acid, polyvinyl chloride, polyester, polyurethane, polyethylene, polyfluoroethylene, polyvinyl alcohol, acryl, and polypropylene. Specifically, the liquid resin may comprise at least one resin selected from the group consisting of polyimide, polyamic acid, and polyvinyl chloride. More specifically, the liquid resin may comprise polyamic acid having a weight average molecular weight of 200,000 to 300,000 g/mole.

That is, the liquid resin may comprise a solid component comprising a resin such as polyamic acid and a liquid component such as an organic solvent. The solid content of the liquid resin may be 15 to 25% by weight based on the total weight of the liquid resin.

The coating liquid may comprise 70 to 85% by weight, particularly 70 to 80% by weight, of the liquid resin.

The dehydrating agent may be acetic anhydride.

The coating liquid may comprise 10 to 20% by weight, particularly 12 to 16% by weight, of the dehydrating agent. If the coating liquid comprises the dehydrating agent in an amount within the above range, workability can be improved due to an excellent dehydrating effect and a proper imidization speed.

The catalyst may comprise at least one selected from the group consisting of 3-methylpyridine and isoquinoline. Specifically, the catalyst may be 3-methylpyridine or isoquinoline.

The coating liquid may contain 1 to 5% by weight, particularly 1 to 2.5% by weight, of the catalyst. If the coating liquid comprises the catalyst in an amount within the above range, the orientation effect is increased such that the graphite sheet thus produced has excellent thermal properties, and workability can be improved due to a proper imidization speed.

The solvent may comprise at least one selected from the group consisting of dimethylformamide, n-methylpyrrolidone, dimethylacetamide, and dimethyl sulfoxide. Specifically, the solvent may be dimethylformamide, n-methylpyrrolidone, dimethylacetamide, or dimethyl sulfoxide.

The coating liquid may comprise 2 to 10% by weight, particularly 4 to 6% by weight, of the solvent. If the coating liquid comprises the solvent in an amount within the above range, it is possible to prevent the difficulty that the coating liquid is not well defoamed due to its high viscosity and the difficulty in controlling the coating thickness.

The coating is not particularly limited as long as it is a method used for coating a substrate. For example, the coating may be carried out through a rolling process, a bar process, a dip coating process, a spray coating process, or the like. Specifically, the coating may be carried out by a process in which a coating liquid is applied to one side or both sides of a substrate and the substrate is passed between upper and lower rolls facing each other. In such event, a polyester protective film may be placed on the coating side of the substrate, and the substrate may then be passed between the rolls while the coating liquid is injected between the substrate and the protective film.

At the time of the coating, the substrate may be coated with the coating liquid in an amount of 0.1 to 1 g/cm$^3$. Specifically, at the time of the coating, the substrate may be coated with the coating liquid in an amount of 0.2 to 0.5 g/cm$^3$.

If necessary, after one side or both sides of the substrate are primarily coated with the coating liquid in the step (b) above, the primarily coated substrate may be secondarily coated with the coating liquid. The primary coating is to fill the coating liquid between the fibers of the substrate to thereby flatten the substrate surface, and the secondary coating is to adjust the thickness of the sheet and to enhance the density.

The substrate may be coated with the coating liquid in an amount necessary to make the substrate surface flat in the primary coating.

The secondary coating may be carried out one to three times. In addition, the coating liquid may be applied on the primarily coated substrate in an amount of 0.1 to 0.3 g/cm$^3$ in the secondary coating.

In the case where the coating liquid comprises polyamic acid as the liquid resin, an imidization step may be further comprised after the step (b) and before the step (c).

The imidization may be performed at 100 to 600° C. Specifically, the imidization may be carried out at 100 to 600° C. for 20 to 25 minutes.

Step (c)

In this step, the coated substrate is thermally treated to graphitize it.

The thermal treatment may be performed at 900 to 3,000° C. for 1 to 20 hours. Specifically, the thermal treatment may comprise a first thermal treatment at 1,000 to 1,600° C. for 0.5 to 10 hours and then a second thermal treatment with a temperature raise to 2,600 to 2,900° C. for 0.5 to 10 hours. In the case of the secondary thermal treatment as described above, the sheet is subjected to a carbonization treatment at a relatively low temperature and then to a graphitization treatment at a relatively high temperature, thereby enhancing the degree of graphitization of the graphite sheet thus produced.

The preparation method may further comprise (d) rolling the graphitized sheet after the step (c).

The rolling may be performed at a pressure of 20 to 50 N/cm$^2$. In addition, the rolling may be carried out one to three times. The first rolling is to flatten the surface of the graphitized sheet, the second rolling is to adjust the thickness of the graphitized sheet to a desired thickness, and the third rolling may be to improve the density of the graphitized sheet.

According to the above method for preparing a graphite sheet, a graphite sheet having a high thermal conductivity and a low resistance can be prepared in a convenient and economical manner without using an expensive polyimide film.

A graphite sheet prepared by the above-described preparation method may have a high thermal conductivity of 900 W/m·K or more and a low resistance of less than 1,000 MΩ, and may have a thickness of 0.01 to 0.3 mm.

The method of preparing a graphite sheet according to an embodiment comprises (1) providing a substrate comprising a natural fiber, a synthetic fiber, or paper;

(2) primarily coating one side or both sides of the substrate with a coating liquid;

(3) secondarily coating the primarily coated substrate with the coating liquid; and (4) thermally treating the secondarily coated substrate to graphitize it, wherein the primary coating is performed by squeezing at a pressure of at least 0.1 MPa.

Step (1)

In this step, a substrate comprising a natural fiber, a synthetic fiber, or paper is provided. The natural fiber, synthetic fiber, and paper are as described in the step (a) above.

Step (2)

In this step, one side or both sides of the substrate are primarily coated with a coating liquid.

The primary coating process may be carried out by the following procedures.

First, the coating liquid is sprayed on one side or both sides of the substrate, and the coating liquid may be disposed inside and/or outside the substrate. Further, the coating liquid may be disposed on the upper and lower sides of the substrate, and a part thereof may permeate into the substrate.

Thereafter, bubbles contained in the substrate and the coating liquid are removed. The bubble removing process may be defined as a squeezing process.

The bubble removing process is performed by squeezing at a pressure of at least 0.1 MPa. Specifically, the primary coating may be carried out by applying the coating liquid on one side or both sides of the substrate and passing the substrate between upper and lower squeeze rolls facing each other under a pressure of 0.1 MPa or more. In such event, a polyester protective film may be placed on the coating surface of the substrate, and the substrate may then be passed between the squeeze rolls while the coating liquid is injected between the substrate and the protective film. More specifically, when the substrate coated with the coating liquid passes between the squeeze rolls, bubbles contained in the substrate can be removed.

By the above-described squeezing process, the coating liquid outside the substrate can better permeate into the substrate. That is, when the coating liquid is only partially impregnated, or is not impregnated at all, in the substrate, the coating liquid may fill all the voids in the substrate by the squeezing process.

Figure 5:
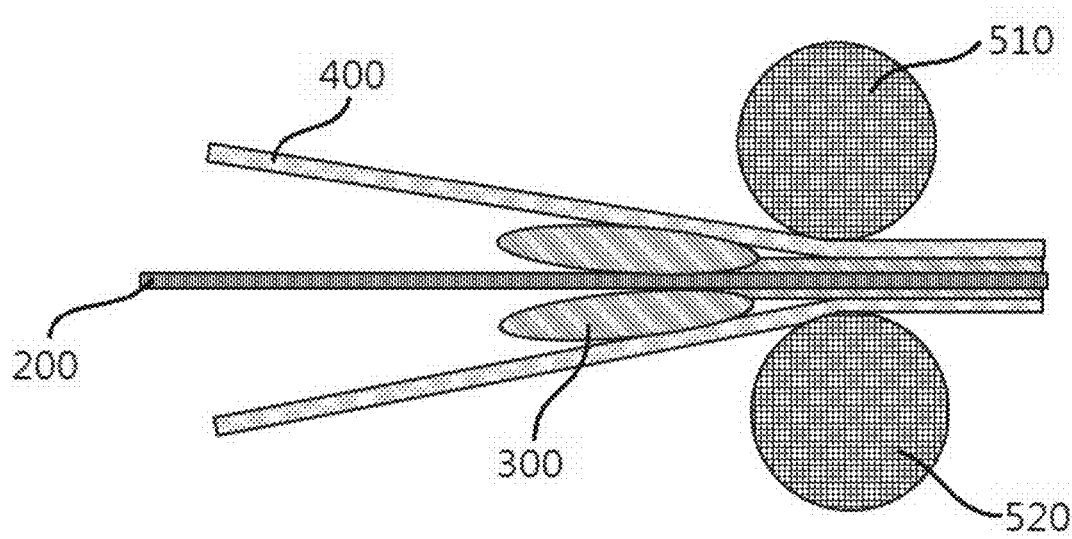
FIG. 5 is a schematic view of the primary coating according to an example, which is a schematic view of coating with a squeeze roll.

With reference to FIG. 5, the primary coating may be performed by placing a polyester protective film (400) on both sides of a substrate (200) and then passing the substrate between squeeze rolls (510 and 520) while a coating liquid (300) is injected between the substrate and the protective film.

In addition, the primary coating is performed by squeezing at a pressure of at least 0.1 MPa, particularly may be performed by squeezing at a pressure of 0.1 to 0.3 MPa.

The coating liquid may comprise 70 to 85% by weight of a liquid resin, 2 to 10% by weight of a solvent, 10 to 20% by weight of a dehydrating agent, and 1 to 5% by weight of a catalyst. The liquid resin, the solvent, the dehydrating agent, and the catalyst are as described above.

In the primary coating, the substrate may be coated in an amount of 0.1 to 1 g cm$^3$. Particularly, the substrate may be coated in an amount of 0.2 to 0.5 g/cm$^3$ in the primary coating.

The thickness of the coating layer in the primary coating may be 30 to 50 μm.

The total thickness of the substrate and the coating liquid after the primary coating process is completed may be 80 to 250 μm.

Step (3)

In this step, the primarily coated substrate is secondarily coated with the coating liquid.

The secondary coating may be performed by applying the coating liquid on one side or both sides of the primarily coated substrate and passing the substrate between upper and lower rolls facing each other. In such event, a polyester protective film may be placed on the coating surface of the primarily coated substrate, and the substrate may then be passed between the rolls while the coating liquid is injected between the primarily coated substrate and the protective film.

Figure 6:
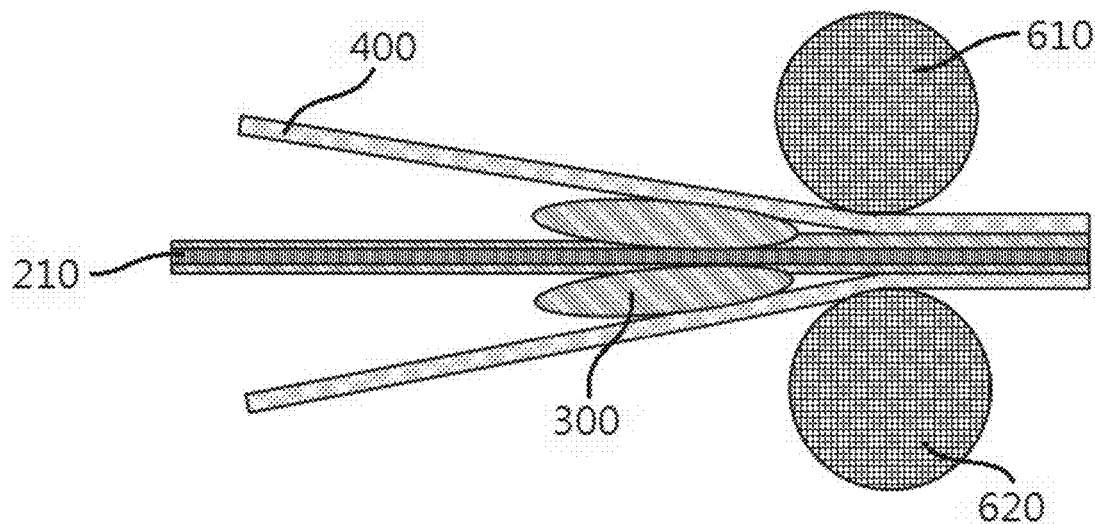
FIG. 6 is a schematic view of the secondary coating according to an example.

With reference to FIG. 6, the secondary coating may be performed by placing a polyester protective film (400) on both sides of a primarily coated substrate (210) and then passing the substrate between rolls (610 and 620) while a coating liquid (300) is injected between the primarily coated substrate and the protective film.

In the secondary coating, the primarily coated substrate may be coated in an amount of 0.1 to 0.5 $g/cm^3$. Specifically, the primarily coated substrate may be coated in an amount of 0.1 to 0.3 $g/cm^3$ in the secondary coating.

Accordingly, a coating layer is formed on the upper side and/or the lower side of the substrate. The coating liquid for forming the coating layer may be substantially the same as the coating liquid used in the primary coating process.

The thickness of the coating layer in the secondary coating may be 30 to 50 μm. If the coating layer is formed on the upper and lower sides of the substrate in the secondary coating, the total thickness of the coating layer (i.e., thickness of the primary coating layer and the secondary coating layer) may be 60 to 100 μm.

In addition, the total thickness of the substrate and the coating layer after the secondary coating process is completed may be 140 to 350 μm.

The secondary coating is for adjusting the thickness of the sheet. If the secondary coating only is carried out without the primary coating using the squeeze rolls as described above, bubbles contained in the substrate (fibers) are not removed while both sides of the substrate are coated so that bubbles will be contained in the sheet. As described above, if the sheet contains bubbles, bubbles may act as defects, which may cause a problem of lowering the thermal conductivity of the sheet. Specifically, bubbles form a space (air layer), which serves as a factor that hinders thermal diffusion, resulting in a decrease in the thermal conductivity of the sheet.

In the case where the coating liquid comprises polyamic acid as the liquid resin, an imidization step may be further comprised after the step (3) and before the step (4).

The imidization may be performed at 100 to 600° C. Specifically, the imidization may be carried out at 100 to 600° C. for 20 to 25 minutes.

Step (4)

In this step, the secondarily coated substrate may be thermally treated to graphitize it.

The thermal treatment may be performed at 900 to 3,000° C. for 1 to 20 hours. Specifically, the thermal treatment may comprise a first thermal treatment at 1,000 to 1,600° C. for 0.5 to 10 hours and then a second thermal treatment with a temperature raise to 2,600 to 2,900° C. for 0.5 to 10 hours. In the case of the secondary thermal treatment as described above, the sheet is subjected to a carbonization treatment at a relatively low temperature and then to a graphitization treatment at a relatively high temperature, thereby enhancing the degree of graphitization of the graphite sheet thus produced.

The preparation method may further comprise (5) rolling the graphitized sheet after the step (4).

The rolling may be performed at a pressure of 20 to 50 $N/cm^2$. In addition, the rolling may be carried out one to three times. The first rolling is to flatten the surface of the graphitized sheet, the second rolling is to adjust the thickness of the graphitized sheet to a desired thickness, and the third rolling may be to improve the density of the graphitized sheet.

The method of preparing a graphite sheet according to an embodiment comprises disposing a coating liquid comprising a liquid resin inside or outside a porous substrate; removing bubbles contained in the porous substrate and the coating liquid; and graphitizing the porous substrate and the coating liquid.

The porous substrate and the coating liquid are as described above.

A step of forming a coating layer on one side or both sides of the porous substrate may be further comprised after the bubble removing step. In the graphitizing step, the coating layer may be graphitized. Specifically, the coating layer has a thickness of 30 to 50 μm and may comprise a liquid resin.

The process conditions of the graphitizing step are as described above.

In the bubble removing step, a pressure of 0.1 MPa or more may be applied to the porous substrate and the coating liquid. The bubble removing step is as described in the bubble removing process above.

According to the method for preparing a graphite sheet, a graphite sheet having a high thermal conductivity can be produced by removing bubbles contained in the substrate to thereby improve the degree of impregnation of the coating liquid. Further, according to the method for preparing a graphite sheet, a graphite sheet having a high thermal conductivity can be produced in a convenient and economical manner without using an expensive polyimide film.

The graphite sheet produced by the above-described preparation method has a high thermal conductivity of 900 W/m·K or more and may have a uniform thickness of 0.01 to 0.3 mm.

MODE FOR THE INVENTION

Hereinafter, the present invention is explained in detail by Examples. The following Examples are intended to further illustrate the present invention without limiting its scope.

EXAMPLES

Preparation Example: Preparation of a Coating Liquid

78% by weight of liquid polyamic acid (manufacturer: KOLON PI, product name: PAA varnish, weight average molecular weight: 250,000 g/mole, solid content: 18% by weight), 6% by weight of dimethylformamide as a solvent, 15% by weight of anhydrous acetic acid as a dehydrating agent, and 1% by weight of 3-methylpyridine as a catalyst were mixed and dispersed at 1,500 rpm for 2 minutes to prepare a coating liquid.

Example 1: Preparation of a Graphite Sheet

A cotton fabric (manufacturer: Han Textile, product name: cotton 100 su) was used as a substrate. A polyethylene terephthalate (PET) protective film was placed on both sides of the substrate at 25° C., and the substrate was then roll pressed while the coating liquid prepared in the Preparation Example was injected between the substrate and the protective film to coat both sides of the substrate with the coating liquid in an amount of 0.3 g/cm$^3$ (primary coating). The primarily coated substrate was subjected to the same coating procedure as described above to coat both surfaces of the substrate with the coating liquid in an amount of 0.2 g/cm$^3$ (secondary coating).

Thereafter, the coated substrate was treated in a hot air furnace at about 150° C. for 10 minutes, at about 250° C. for 5 minutes, and at about 400° C. for 5 minutes to prepare an imidized substrate film having a thickness of 120 μm.

The imidized substrate film was heated while the temperature was raised at a rate of 1° C./min in a nitrogen atmosphere (at a pressure of about 100 torr) and subjected to a first thermal treatment at a final temperature of about 1,000° C. for 7 hours. Then, the temperature was raised at a rate of 5° C./min, and the substrate film was subjected to a second thermal treatment at about 2,700° C. for 2 hours to thereby prepare a graphitized sheet.

The graphitized sheet was roll pressed by passing between upper and lower rolls facing each other while it was pressurized at a pressure of 50 N/cm$^2$. The rolling was carried out three times to prepare a graphite sheet having a thickness of 40 μm.

Comparative Example 1: Synthetic Graphite Sheet

A commercial graphite sheet of SGS 40 μm (product name) from CX-Carbon was used.

Test Example 1

The graphite sheets of Example 1 and those of Comparative Example 1 were measured for their properties as described below, and the results are shown in Tables 1 and 2 below.

(1) Specific Heat and Thermal Diffusivity

Specific heat and thermal diffusivity of the graphite sheets at 50° C. were measured using a LFA 447 model of NETZSCH.

(2) Density

Density of the graphite sheets was measured using an Archimedes density meter of Alfa Mirage.

(3) Thermal Conductivity

Thermal conductivity of the graphite sheets was calculated by thermal diffusivity×density×specific heat.

(4) Inductance and Resistance

Inductance and resistance were measured at 6.78 MHz using an impedance analyzer (manufacturer: Agilent, model: Agilent 4294A).

TABLE 1

| | Thickness (μm) | Sp. Heat (J/g · K) | Density (g/cm)$^3$ | Thermal diffusivity (mm$^2$/s) | Thermal conductivity (W/m · K) |
|---|---|---|---|---|---|
| Ex. 1 | 40 | 0.85 | 1.58 | 673 | 903 |
| Com. Ex. 1 | 40 | 0.85 | 1.6 | 603 | 820 |

TABLE 2

| | Thickness (μm) | Inductance (nH) | Resistance (MΩ) |
|---|---|---|---|
| Ex. 1 | 40 | 723 | 935 |
| Com. Ex. 1 | 40 | 722 | 1,029 |

As shown in Table 2, the graphite sheet of Example 1 had a lower resistance than that of the synthetic graphite sheet of Comparative Example 1. In addition, as shown in Table 1, the graphite sheet of Example 1 had a high thermal conductivity exceeding 900 W/m·K.

Example 2

A cotton fabric (manufacturer: Han Textile, product name: cotton 100 su) was used as a substrate. A polyethylene terephthalate (PET) protective film was placed on both sides of the substrate at 25° C., and the substrate was then squeezed while liquid polyamic acid (manufacturer: KOLON PI, product name: PAA varnish) as a coating liquid was injected between the substrate and the protective film to coat both sides of the substrate with the coating liquid in an amount of 0.3 g/cm$^3$ (primary coating). The PET protective films were removed from both sides of the primarily coated substrate, and new PET protective films were placed thereon. The substrate was then roll pressed while the coating liquid was injected between the primarily coated substrate and the protective film to coat both sides of the substrate with the coating liquid in an amount of 0.2 g/cm$^3$ (secondary coating).

Specifically, with reference to FIG. 5, the primary coating was performed by passing the substrate (100) between the upper and lower squeeze rolls (410 and 420) facing each other at a pressure of 0.2 MPa. In addition, with reference to FIG. 6, the secondary coating was performed by passing the primarily coated substrate (110) between the upper and lower rolls (510 and 520) facing each other.

Thereafter, the secondarily coated substrate was treated in a hot air furnace at about 150° C. for 10 minutes, at about 250° C. for 5 minutes, and at about 400° C. for 5 minutes to prepare an imidized substrate film having a thickness of 120 μm.

The imidized substrate film was heated while the temperature was raised at a rate of 1° C./min in a nitrogen atmosphere (at a pressure of about 100 torr) and subjected to a first thermal treatment at a final temperature of about 1,000° C. for 7 hours. Then, the temperature was raised at a rate of 5° C./min, and the substrate film was subjected to a second thermal treatment at about 2,700° C. for 2 hours to prepare a graphitized sheet.

The graphitized sheet was roll pressed by passing between upper and lower rolls facing each other while it was pressurized at a pressure of 50 N/cm$^2$. The rolling was carried out three times to prepare a graphite sheet having a thickness of 40 μm.

Comparative Example 2

A graphite sheet was prepared in the same manner as in Example 2, except that the secondary coating (main coating) only was performed without performing the primary coating under squeezing.

Test Example 2

The graphite sheets of Example 2 and those of Comparative Example 2 were measured for their properties as described below. Further, the graphite sheet thus prepared was cut into 130 mm×130 mm in width and length, which was used as a test sample. In addition, the results are shown in Tables 3 and 4 below.

(1) Evaluation of Whether Bubbles were Contained

Figure 2:
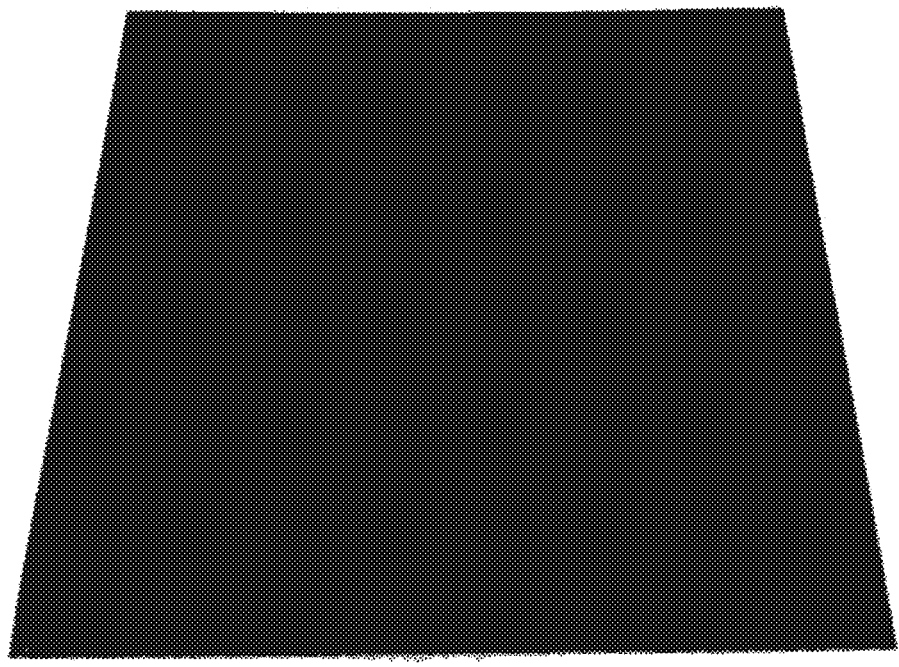
FIGS. 2 and 4 are a photograph of the surface and an enlarged photograph of the cross-section of the graphite sheet according to Example 2, respectively.

The surface of the graphite sheet was observed with naked eyes to evaluate whether or not the sheet contained bubbles. The results are shown in FIGS. 1 and 2. Further, a cross-section of the graphite sheet enlarged by 20 times was observed using an optical microscope, and the results are shown in FIGS. 3 and 4.

Figure 3:
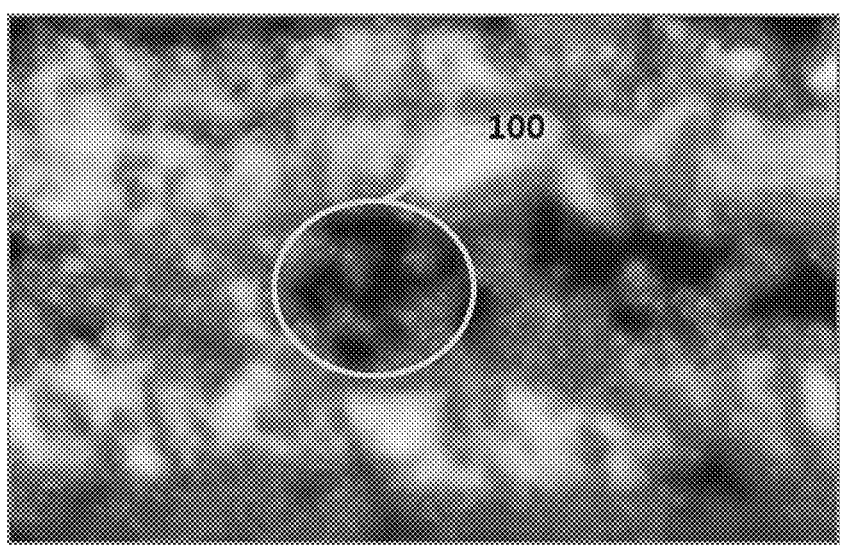
Figure 4:
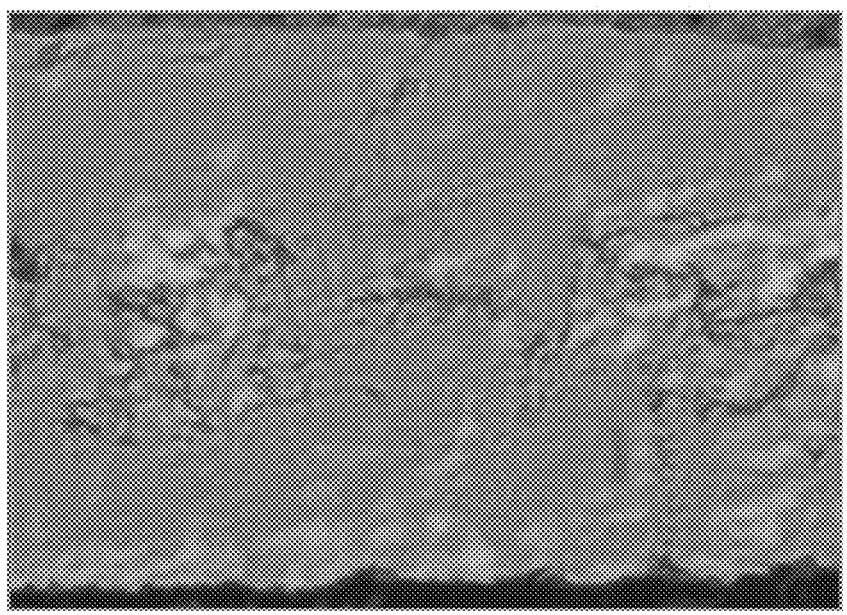

Specifically, FIGS. 1 and 3 are a photograph of the surface and an enlarged photograph of a cross-section of the graphite sheet according to Comparative Example 2, respectively. FIGS. 2 and 4 are a photograph of the surface and an enlarged photograph of a cross-section of the graphite sheet according to Example 2, respectively.

(2) Evaluation of Thickness Variation of the Coating Layer and Impregnation Level of the Coating Liquid The graphite sheet was cut to reveal a cross-section, and a mounting specimen was prepared with a solution containing an epoxy solution (manufacturer: UNI-LAB & Co. GMBH, product name: CO-Cast Resin) and a hardener (manufacturer: UNI-LAB & Co. GMBH, product name: CO-Cast Hardener) in a weight ratio of 4:1. Thereafter, it was polished with #2000 sandpaper, and the thickness variation of the coating layer and the impregnation level of the coating liquid were evaluated using an optical microscope.

(3) Weight

Weight of the graphite sheet was measured using an Archimedes density meter of Alfa Mirage.

(4) Specific Heat, Density, Thermal Diffusivity, and Thermal Conductivity

Specific heat, density, thermal diffusivity, and thermal conductivity of the graphite sheet were measured or calculated in the same manner as in Sections (1) to (3) of Test Example 1.

TABLE 3

|  | Com. Ex. 2 | Ex. 2 | Remark |
| --- | --- | --- | --- |
| Thickness variation of coating layer (μm) | ±5 μm | ±2 μm | Improved coating layer uniformity (±3 μm) |
| Impregnation level | No partial impregnation | Mostly impregnated | Optical microscope observation |
| Weight (g) | 1.6 | 1.7 | Increase in impregnation due to reduction of bubbles inside the fiber (increase in weight) |
| Evaluated sample size (mm × mm) | 130 × 130 |  | Length × width |

TABLE 4

|  | Thickness (μm) | Sp. Heat (J/g · K) | Density (g/cm$^3$) | Thermal diffusivity (mm$^2$/s) | Thermal conductivity (W/m · K) | Remark |
| --- | --- | --- | --- | --- | --- | --- |
| Ex. 2 | 40 | 0.85 | 1.7 | 668 | 965 | Squeezing |
| Com. Ex. 2 | 40 | 0.85 | 1.61 | 602 | 824 | No squeezing |

As shown in FIGS. 1 to 4 and Table 3, the graphite sheet of Example 2 did not contain bubbles through a squeezing process (i.e., primary coating process) in which bubbles were removed in advance while the coating liquid was impregnated into the substrate. In contrast, since the coating liquid was partially impregnated in the substrate of the graphite sheet of Comparative Example 2, the substrate contained bubbles (the circles in FIG. 1 and numeral 100 in FIG. 3). Further, as compared with the graphite sheet of Comparative Example 2, the graphite sheet of Example 2 had a coating layer in a uniform thickness within a coating layer thickness variation of 2 μm or less.

Furthermore, as shown in Table 4, the graphite sheet of Example 2 had a significantly higher thermal diffusivity than that of the graphite sheet of Comparative Example 2.

EXPLANATION OF REFERENCE NUMERALS

100: Bubbles in the graphite sheet
200: Substrate
210: Primarily coated substrate
300: Coating liquid
400: Polyester protective film
510, 520: Upper and lower squeeze rolls
610, 620: Upper and lower rolls

The invention claimed is:

1. A method of preparing a graphite sheet, comprising:
 (a) providing a substrate comprising a natural fiber, a synthetic fiber, or paper;
 (b) coating one side or both sides of the substrate with a coating liquid; and
 (c) thermally treating the coated substrate to graphitize it, wherein the coating liquid comprises 70 to 85% by weight of a liquid resin, 2 to 10% by weight of a solvent, 10 to 20% by weight of a dehydrating agent, and 1 to 5% by weight of a catalyst.

2. The method of preparing a graphite sheet of claim 1, wherein the liquid resin comprises polyamic acid having a weight average molecular weight of 200,000 to 300,000 g/mole.

3. The method of preparing a graphite sheet of claim 2, further comprising an imidization step after the step (b) and before the step (c) and
wherein the imidization step is performed at 100 to 600° C.

4. The method of preparing a graphite sheet of claim 1, wherein the dehydrating agent is acetic anhydride.

5. The method of preparing a graphite sheet of claim 1, wherein the catalyst comprises at least one selected from the group consisting of 3-methylpyridine and isoquinoline.

6. The method of preparing a graphite sheet of claim 1, wherein the solvent comprises at least one selected from the group consisting of dimethylformamide, n-methylpyrrolidone, dimethylacetamide, and dimethyl sulfoxide.

7. The method of preparing a graphite sheet of claim 1, wherein the thermal treatment in the step (c) is performed at a temperature of 900 to 3,000° C. for 1 to 20 hours.

8. The method of preparing a graphite sheet of claim 1, further comprising (d) rolling the graphitized sheet after the step (c) and
wherein the rolling is performed at a pressure of 20 to 50 $N/cm^2$.

* * * * *